US011691601B2

United States Patent
Uehara et al.

(10) Patent No.: US 11,691,601 B2
(45) Date of Patent: Jul. 4, 2023

(54) PARKING BRAKE CONTROL APPARATUS FOR VEHICLE

(71) Applicant: MAZDA MOTOR CORPORATION, Hiroshima (JP)

(72) Inventors: Shigeyuki Uehara, Hiroshima (JP); Tomoji Izumi, Hiroshima (JP); Toshiya Oue, Hiroshima (JP); Takeshi Yabuki, Hiroshima (JP); Tsuyoshi Kojima, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 335 days.

(21) Appl. No.: 17/047,988

(22) PCT Filed: Mar. 25, 2019

(86) PCT No.: PCT/JP2019/012338
§ 371 (c)(1),
(2) Date: Oct. 15, 2020

(87) PCT Pub. No.: WO2019/202913
PCT Pub. Date: Oct. 24, 2019

(65) Prior Publication Data
US 2021/0155207 A1 May 27, 2021

(30) Foreign Application Priority Data
Apr. 20, 2018 (JP) .................................. 2018-081423

(51) Int. Cl.
*B60T 7/12* (2006.01)
*B60T 17/22* (2006.01)

(52) U.S. Cl.
CPC ................ *B60T 7/12* (2013.01); *B60T 17/22* (2013.01); *B60T 2201/06* (2013.01); *B60T 2201/10* (2013.01); *B60Y 2300/18108* (2013.01)

(58) Field of Classification Search
CPC ........ B60T 7/12; B60T 17/22; B60T 2201/06; B60T 2201/10; B60Y 2300/18108
See application file for complete search history.

(56) References Cited

U.S. PATENT DOCUMENTS 4,561,527 A * 12/1985 Nakamoto ................ B60T 7/12
                                                          192/35
4,629,043 A * 12/1986 Matsuo ................ B60T 13/746
                                                          477/92
(Continued)

FOREIGN PATENT DOCUMENTS

| JP | 2003-327101 A | 11/2003 |
|----|---------------|---------|
| JP | 3945387 B2    | 7/2007  |

(Continued)

OTHER PUBLICATIONS

"Peugeot 508: Freno di stazionamento elettrico", Dec. 31, 2018, XP002802824, Retrieved from the Internet: URL:http://www.dautoita.com/peugeot_508-5/freno_di_stazionamento_elettrico-639.html.

(Continued)

*Primary Examiner* — Pamela Rodriguez
(74) *Attorney, Agent, or Firm* — Studebaker & Brackett PC

(57) ABSTRACT

A vehicle parking brake control includes a parking switch for switching the parking brake between ON and OFF, a vehicle power source switch for switching a power source of the vehicle between ON and OFF, a parking brake controller for executing automatic application control when the power source is operated from ON to OFF by the occupant with use of the vehicle power source switch, and a prohibition (Continued)

condition determination unit for determining that when the parking brake is OFF, the vehicle is stopped, and the vehicle power source is ON, a prohibition condition for prohibiting automatically turning the parking brake on is satisfied when a turning-off operation for the vehicle power source switch is executed after a turning-off operation for the parking switch is executed. When a determination is made that the prohibition condition is satisfied, the parking brake controller does not execute the automatic application control.

19 Claims, 11 Drawing Sheets

(56) References Cited

U.S. PATENT DOCUMENTS

| | | | |
|---|---|---|---|
| 6,019,436 A | 2/2000 | Siepker | |
| 8,041,475 B2* | 10/2011 | Fujita | B60T 7/12 |
| | | | 307/10.6 |
| 10,322,706 B2* | 6/2019 | Uehara | B60T 7/085 |
| 2004/0016612 A1 | 1/2004 | Iwagawa et al. | |
| 2004/0104619 A1 | 6/2004 | Manaka | |
| 2010/0206118 A1 | 8/2010 | Nagashima et al. | |
| 2016/0186859 A1 | 6/2016 | Parker, Jr. et al. | |
| 2017/0151936 A1* | 6/2017 | Takase | B60T 8/171 |

FOREIGN PATENT DOCUMENTS

| | | |
|---|---|---|
| JP | 3978261 B2 | 9/2007 |
| JP | 2010-190311 A | 9/2010 |
| JP | 2017-226352 A | 12/2017 |
| WO | 2015/016109 A1 | 2/2015 |

OTHER PUBLICATIONS

The extended European search report issued by the European Patent Office dated Jul. 23, 2021, which corresponds to European Patent Application No. 19787573.5-1012 and is related to U.S. Appl. No. 17/047,988.

International Search Report issued in PCT/JP2019/012338; dated May 28, 2019.

* cited by examiner

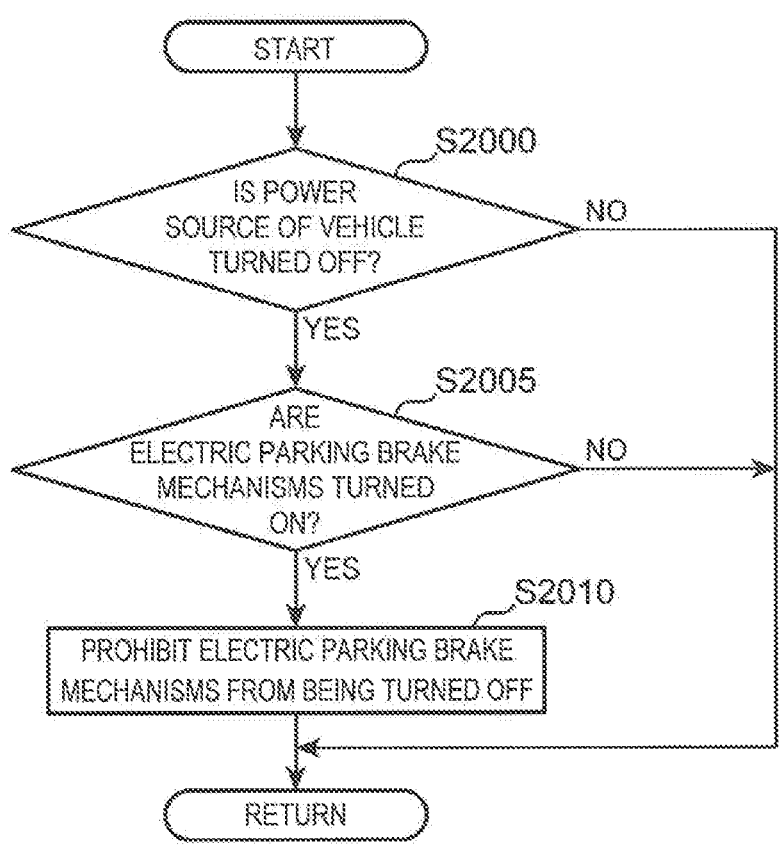

PARKING BRAKE CONTROL APPARATUS FOR VEHICLE

TECHNICAL FIELD

The technique disclosed herein relates to a parking brake control apparatus for a vehicle that controls a parking brake of a vehicle.

BACKGROUND ART

In related art, automatic application control has been known in which an electric parking brake is automatically actuated when a power source of a vehicle is turned off (for example, see Patent Literature 1). Further, in a technique disclosed in Patent Literature 2, when a vehicle power source switch is turned off in a state where a brake pedal is depressed, the automatic application control is executed in which an electric parking brake is automatically actuated.

For example, when a vehicle is towed in trouble or the like, a parking brake has to be turned off. Further, in car washing stations in Europe, in general, only one of left and right wheels is placed on a belt conveyor, the vehicle is moved to an automatic car wash, and automatic car washing is performed. Thus, the parking brake has to be turned off. As described above, there may be a case where it is not desired to execute the automatic application control in which an electric parking brake is automatically actuated when a power source of the vehicle is turned off by a vehicle power source switch. Accordingly, it is demanded that non-execution of the automatic application control be easily enabled by an operation by an occupant.

CITATION LIST

Patent Literature

Patent Literature 1: Japanese Patent No. 3978261
Patent Literature 2: Japanese Patent No. 3945387

SUMMARY OF INVENTION

An object of the technique disclosed herein is to provide a parking brake control apparatus for a vehicle that easily enables non-execution of automatic application control by an operation by an occupant.

To solve the above-described problem, one aspect of the technique disclosed herein provides a parking brake control apparatus for a vehicle, the parking brake control apparatus controlling a parking brake of the vehicle, the parking brake control apparatus including:

a parking switching operation unit provided in a position at which an occupant of the vehicle can operate the parking switching operation unit, the parking switching operation unit switching the parking brake between ON and OFF;

a vehicle power source switching operation unit provided in a position at which the occupant can operate the vehicle power source switching operation unit, the vehicle power source switching operation unit switching a power source of the vehicle between ON and OFF;

a parking brake controller controlling the parking brake and executing automatic application control in which the parking brake is automatically turned on when the power source of the vehicle is operated from ON to OFF by the occupant with use of the vehicle power source switching operation unit; and a prohibition condition determination unit determining that a prohibition condition for prohibiting the automatic application control is satisfied when a turning-off operation for the vehicle power source switching operation unit is executed after a turning-off operation for the parking switching operation unit is executed in a state where the power source of the vehicle is ON, a state where the vehicle is stopped, and a state where the parking brake is OFF, in which when a determination is made that the prohibition condition is satisfied, the parking brake controller does not execute the automatic application control.

In the parking brake control apparatus for a vehicle, the occupant only performs the turning-off operation for the parking switching operation unit and the turning-off operation for the vehicle power source switching operation unit in this order, and non-execution of the automatic application control may thereby easily be achieved.

BRIEF DESCRIPTION OF DRAWINGS

FIG. 11 is a flowchart schematically illustrating one example of an action procedure about control of electric parking brake mechanisms.

DESCRIPTION OF EMBODIMENT

Figure 1:
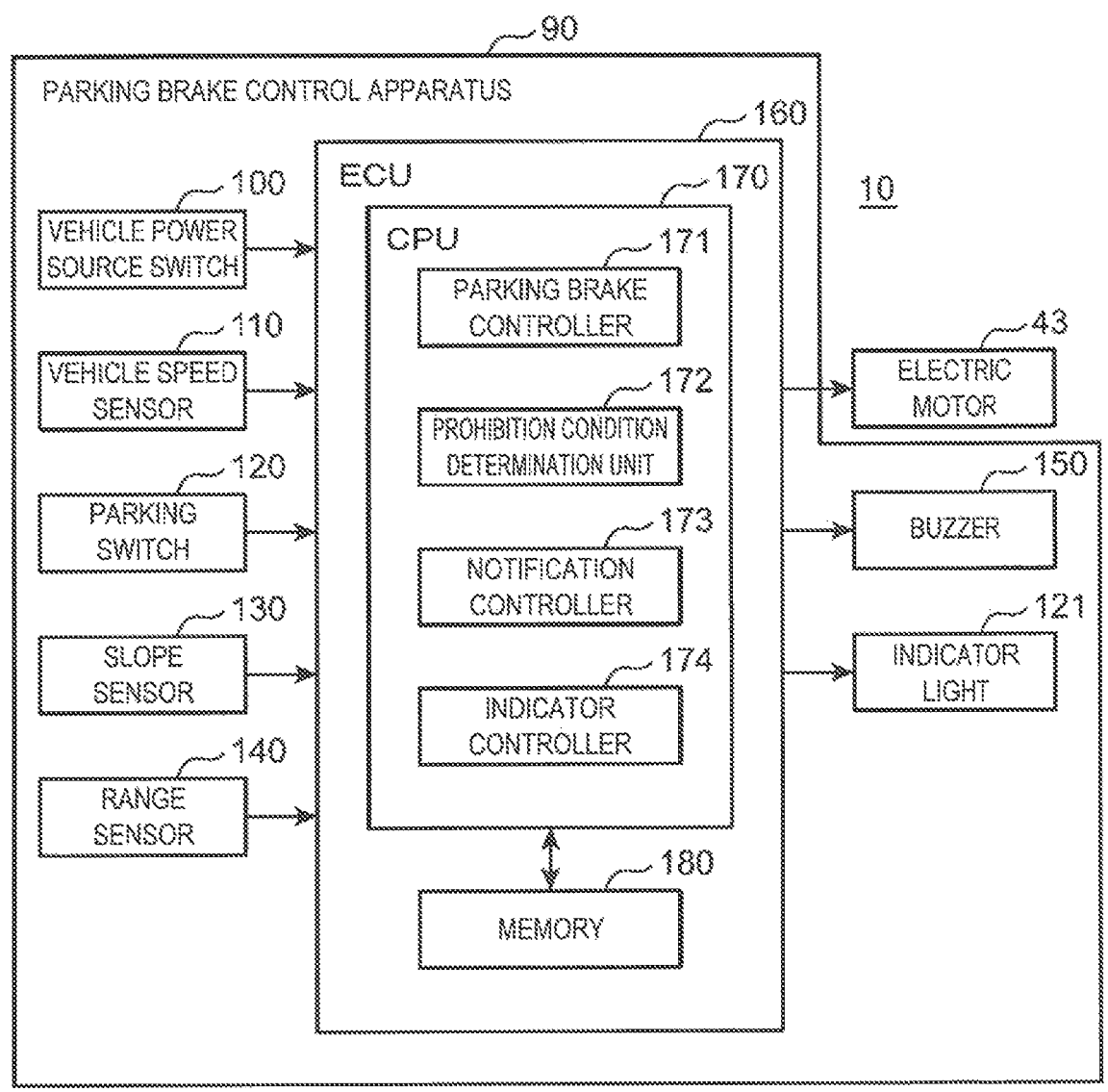
FIG. 1 is a block diagram schematically illustrating a control configuration of a vehicle including a parking brake control apparatus for a vehicle of this embodiment.

Embodiments of the present disclosure will hereinafter be described with reference to drawings. Note that in the drawings, the same reference characters are given to the same elements, and a description will appropriately be omitted.

Figure 2:
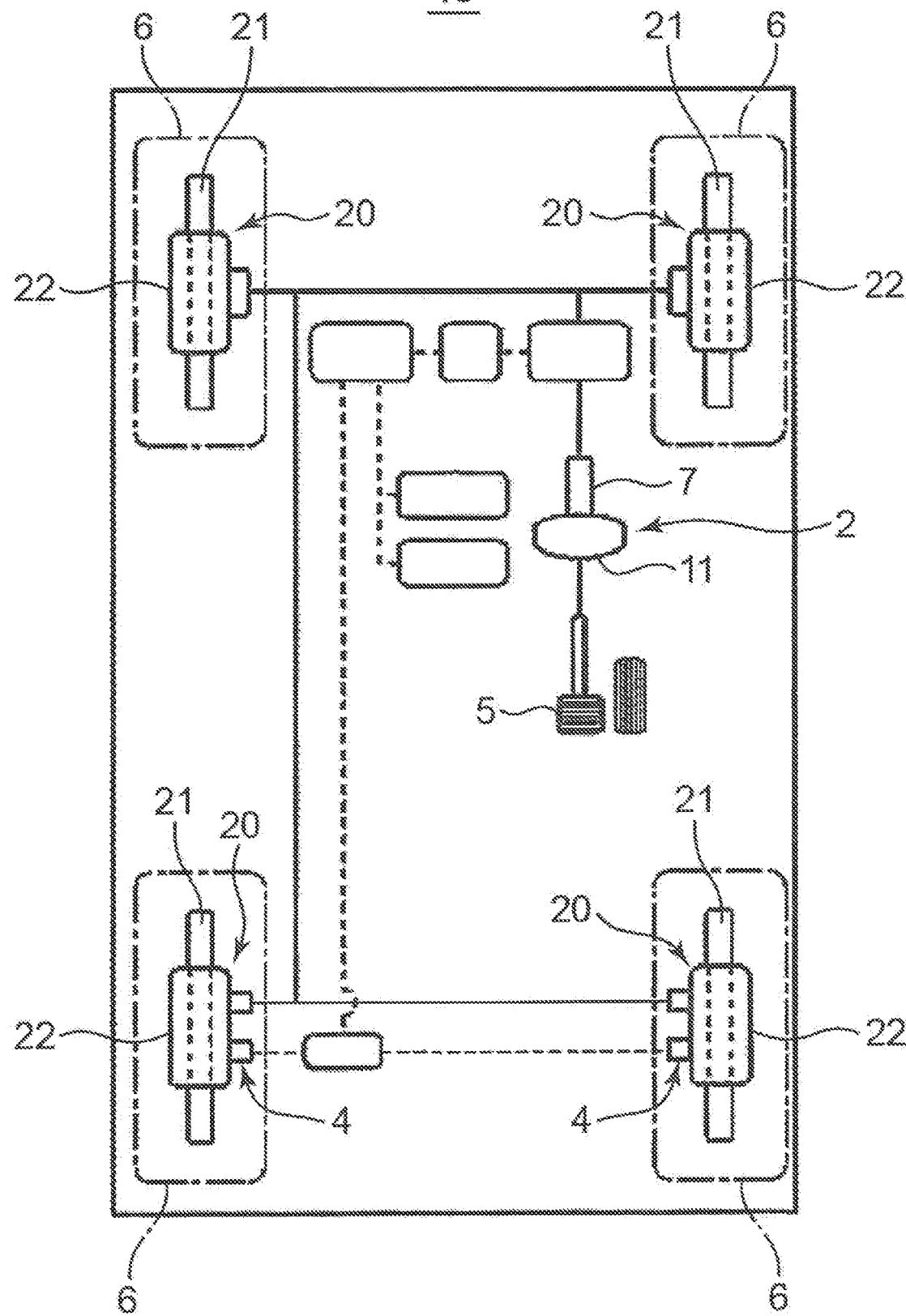
FIG. 2 is a diagram schematically illustrating a brake mechanism of the vehicle illustrated in FIG. 1.
Figure 3:
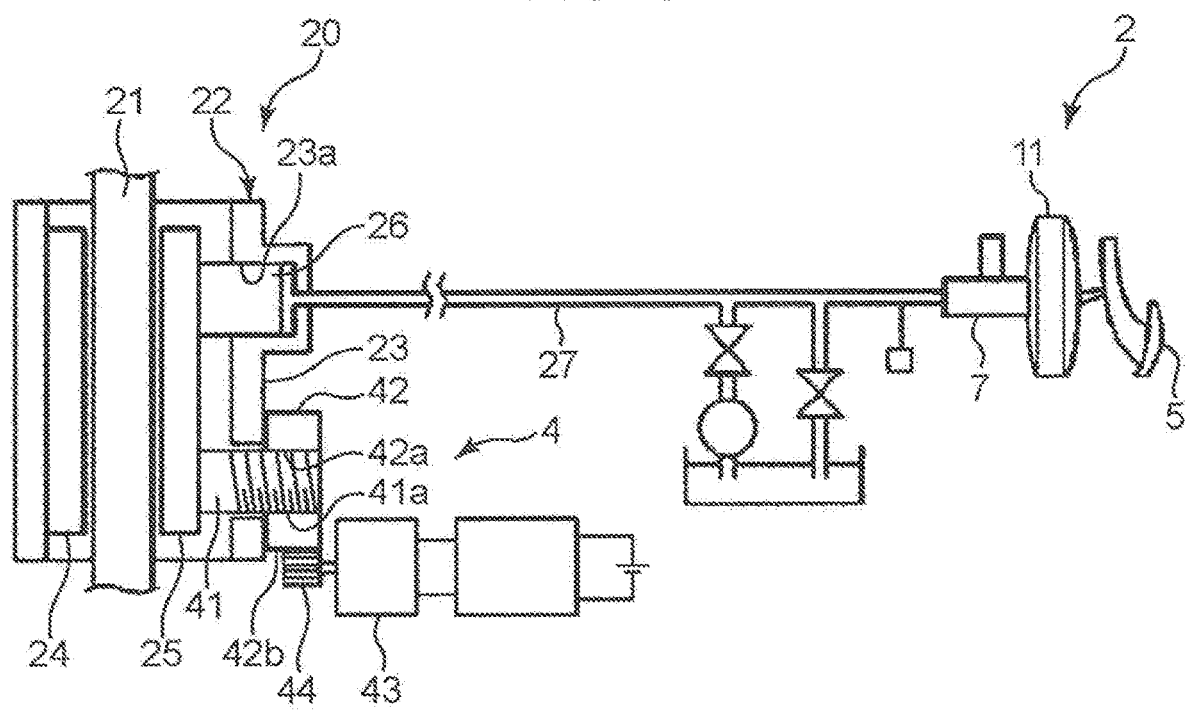
FIG. 3 is a diagram schematically illustrating the brake mechanism of the vehicle illustrated in FIG. 1.
Figure 4:
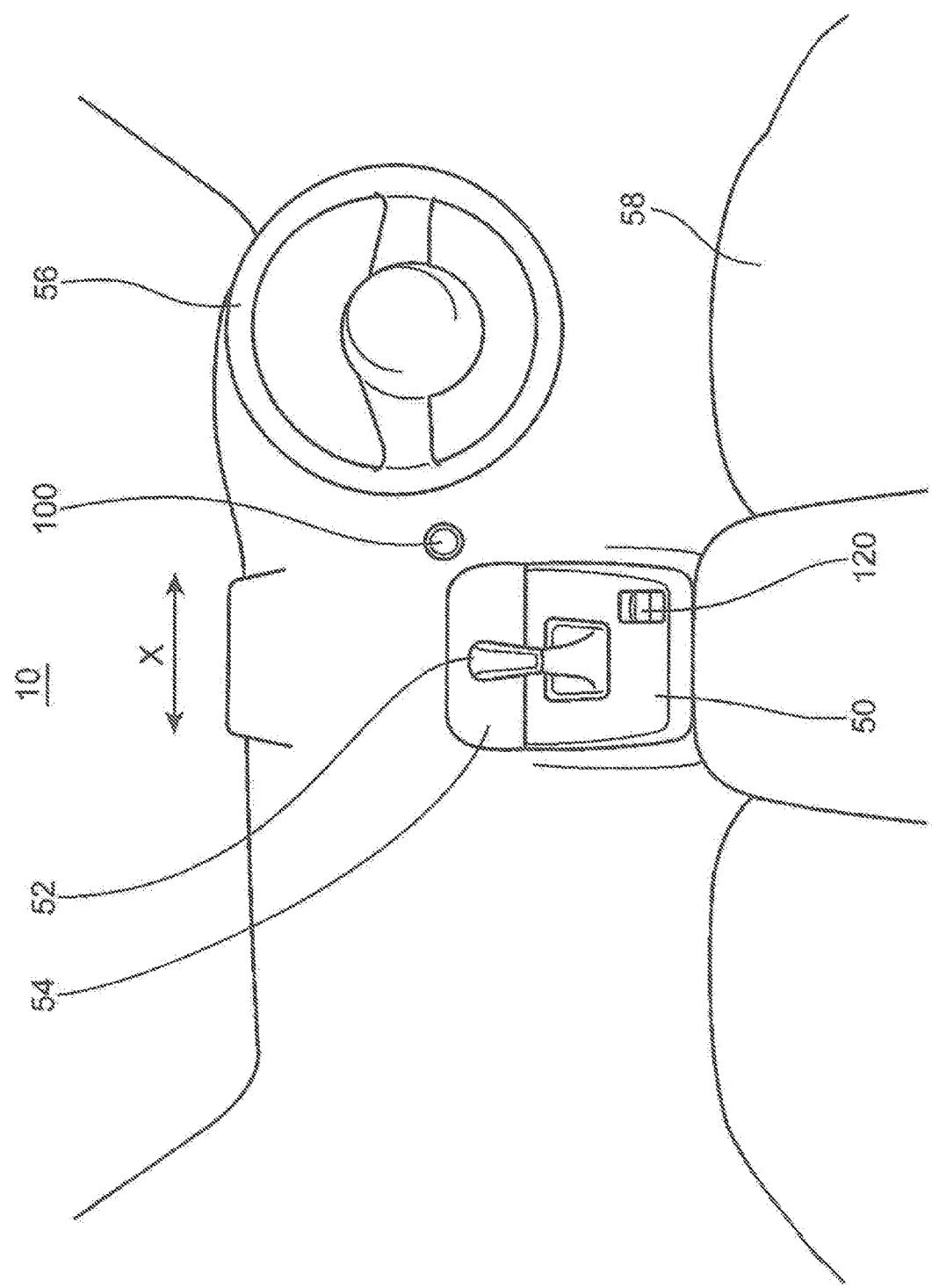
FIG. 4 is a diagram schematically illustrating an external appearance around a driver seat of the vehicle illustrated in FIG. 1.
Figure 5:
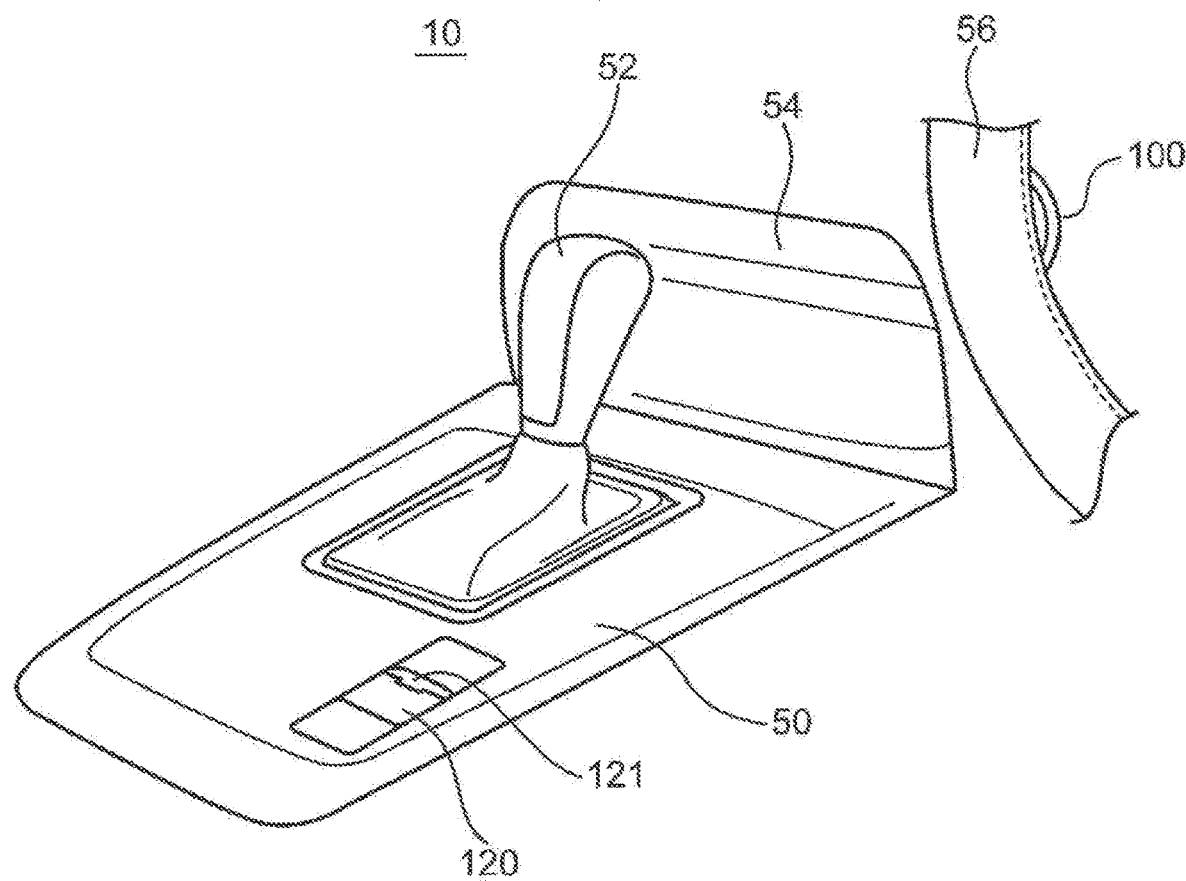
FIG. 5 is a diagram schematically illustrating an external appearance around the driver seat of the vehicle illustrated in FIG. 1.

FIG. 1 is a block diagram schematically illustrating a control configuration of a vehicle 10 including a parking brake control apparatus for a vehicle of this embodiment. FIG. 2 and FIG. 3 are diagrams schematically illustrating a brake mechanism of the vehicle 10 illustrated in FIG. 1. FIG. 4 and FIG. 5 are diagrams schematically illustrating external appearances around a driver seat 58 of the vehicle 10 illustrated in FIG. 1. The vehicle 10 is a four-wheel automobile, for example.

As illustrated in FIG. 2 and FIG. 3, the vehicle 10 includes a foot brake mechanism 2 and electric parking brake mechanisms 4 (corresponding to one example of a parking brake).

The foot brake mechanism 2 is configured to be capable of braking two pairs of wheels 6 in front and rear by supplying a brake fluid pressurized (hereinafter referred to as "brake fluid pressure") in accordance with a depressing operation of a brake pedal 5 to two pairs of hydraulic brake mechanisms 20 in front and rear.

The foot brake mechanism 2 includes the brake pedal 5, a master cylinder 7, booster 11, the hydraulic brake mechanisms 20, and so forth. The booster 11 has a movable wall (not illustrated) movable in an axis direction inter-connectedly with the brake pedal 5 and boosts a depressing force on the brake pedal 5 by using the differential pressure between a negative pressure chamber and an atmospheric chamber partitioned by the movable wall. The hydraulic brake mechanisms 20 respectively provided to the four wheels 6 are connected with the master cylinder 7 by a conduit line 27 and apply braking forces to the respective wheels 6 in accordance with the depressing operation of the brake pedal 5 by an occupant.

As illustrated in FIG. 3, each of the hydraulic brake mechanisms 20 includes a rotor disk 21 provided to the wheel 6 in an integrally rotatable manner, a caliper 22 capable of applying a braking force to the rotor disk 21, and so forth. The caliper 22 includes a caliper body 23 disposed across the rotor disk 21 in a saddle-like manner and an outer-side brake pad 24 and an inner-side brake pad 25 that are disposed on both sides of the rotor disk 21 with the rotor disk 21 interposed therebetween in an internal portion of the caliper body 23. A piston 26 movable in an axial direction of the rotor disk 21 is disposed on an inner side of the inner-side brake pad 25, and the piston 26 is slidably fitted into a cylinder hole 23a formed in the caliper body 23. The conduit line 27 is connected with the cylinder hole 23a.

When the occupant performs the depressing operation of the brake pedal 5, the brake fluid pressure is transmitted through the conduit line 27, is supplied to the cylinder hole 23a, and causes the piston 26 to move forward and outward in the axial direction. In response to this, the inner-side brake pad 25 is pushed onto an inner side of the rotor disk 21, the reaction force against this causes the caliper body 23 to move inward, and the outer-side brake pad 24 is pushed onto an outer side of the rotor disk 21. Consequently, a braking force of the foot brake mechanism 2 is generated.

The electric parking brake mechanism 4 is actuated independently from the depressing operation of the brake pedal 5. As illustrated in FIG. 3, the electric parking brake mechanism 4 includes a piston 41, an annular member 42, an electric motor 43, and so forth. A male thread portion 41a is formed in an inner end side portion of the piston 41, and the male thread portion 41a is screwed with a female thread portion 42a formed in an inner surface portion of the annular member 42. A gear surface portion 42b is formed in an outer surface portion of the annular member 42, and the gear surface portion 42b is screwed with a pinion 44 attached to a driving shaft of the electric motor 43 in an integrally rotatable manner. Accordingly, the annular member 42 is rotated and driven by driving the electric motor 43, and the piston 41 is thereby caused to move forward and backward with respect to the axial direction. When the piston 41 moves forward and outward in the axial direction, the inner-side brake pad 25 and the outer-side brake pad 24 are pushed onto the rotor disk 21, and a braking force of the electric parking brake mechanism 4 is generated.

As illustrated in FIG. 1, the vehicle 10 includes a parking brake control apparatus 90 and the electric motors 43. The parking brake control apparatus 90 includes a vehicle power source switch 100, a vehicle speed sensor 110, a parking switch 120, a slope sensor 130, a buzzer 150, an indicator light 121, and an electronic control unit (ECU) 160. The ECU 160 includes a central processing unit (CPU) 170, a memory 180, and other peripheral circuits.

The memory 180 is configured with a semiconductor memory, a hard disk, or other storage elements, for example. The memory 180 includes a read-only memory (ROM), a random access memory (RAM), and so forth. Note that the memory 180 may be configured with a single memory including a region saving a program and a region temporarily saving data.

The CPU 170 acts in accordance with a program saved in the memory 180 and thereby functions as a parking brake controller 171, a prohibition condition determination unit 172, a notification controller 173, and an indicator controller 174. Each function of the CPU 170 will be described later.

The vehicle power source switch 100 (corresponding to one example of a vehicle power source switching operation unit) is a switch for switching a power source of the vehicle 10 between ON and OFF. When the occupant operates the vehicle power source switch 100 while depressing the brake pedal 5, for example, in a state where the power source of the vehicle 10 is OFF, an ignition (power source) of the vehicle 10 is turned on. When the occupant operates the vehicle power source switch 100 in a state where the ignition (power source) of the vehicle 10 is ON, the power source of the vehicle 10 is turned off.

A state where the ignition (power source) of the vehicle 10 is ON means a state where power is supplied from the power source of the vehicle 10 to vehicle devices. A state where the power source of the vehicle 10 is OFF means a state where power is not supplied from the power source of the vehicle 10 to the vehicle devices. The vehicle devices include an actuator such as an ignition device for engine control, for example.

The vehicle speed sensor 110 detects a traveling speed of the vehicle 10 based on a rotation speed of the wheel 6 (FIG. 2), for example. The slope sensor 130 detects the slope of the vehicle 10 (in other words, the slope of a road on which the vehicle 10 is positioned). Each of the sensors 110 and 130 outputs a detection value to the ECU 160.

The parking switch 120 (corresponding to one example of a parking switching operation unit) is a switch operated by the occupant and being for switching the electric parking brake mechanisms 4 between ON and OFF. When the occupant performs a turning-on operation in which the parking switch 120 is pulled up by his/her finger, for example, the electric parking brake mechanism 4 being OFF is turned on. When the occupant performs a turning-off operation in which the parking switch 120 is pushed down by his/her finger, for example, the electric parking brake mechanism 4 being ON is turned off. When the occupant releases his/her finger from the parking switch 120, the parking switch 120 returns to a neutral position.

A state where the electric parking brake mechanisms are ON means a braking state where the electric parking brake mechanisms 4 brake the wheels 6 (FIG. 2). A state where the electric parking brake mechanisms 4 are OFF means a non-braking state where the electric parking brake mechanisms 4 do not brake the wheels 6 (FIG. 2).

The indicator light 121 is integrally formed with the parking switch 120. The indicator light 121 is for notifying information about actuation situations of the electric parking brake mechanisms 4 to the occupant. The indicator light 121 is controlled by the indicator controller 174 of the CPU 170.

As illustrated in FIG. 4 and FIG. 5, the parking switch 120 is arranged in a center console 50 and is easily operable by the occupant seated on the driver seat 58. As illustrated in FIG. 4 and FIG. 5, the vehicle power source switch 100 is arranged between a center cluster 54 and a steering wheel 56 and is easily operable by the occupant seated on the driver seat 58. In this embodiment, as illustrated in FIG. 4 and FIG. 5, the parking switch 120 and the vehicle power source switch 100 are arranged on the same side with respect to the steering wheel 56. In other words, the parking switch 120 and the vehicle power source switch 100 are arranged on a central side in a width direction X of the vehicle 10 with respect to the steering wheel 56.

Note that in this embodiment, as illustrated in FIG. 4 and FIG. 5, for the vehicle power source switch 100 a pushbutton system is employed which is operated by being pushed by a finger of the occupant; however, a key cylinder system may be employed which the occupant operates by inserting an ignition key and rotating a key cylinder.

The buzzer 150 (corresponding to one example of a notification unit) is for notifying information about cancellation of automatic application control to the occupant. The buzzer 150 is controlled by the notification controller 173 of the CPU 170.

The parking brake controller 171 of the CPU 170 controls ON and OFF of the electric parking brake mechanisms 4 in accordance with the operation of the parking switch 120. When the occupant uses the vehicle power source switch 100 to perform an operation for turning off the power source of the vehicle 10, the parking brake controller 171 executes the automatic application control in which the electric parking brake mechanisms 4 are automatically actuated.

In a state where the vehicle 10 is stopped and a state where the electric parking brake mechanisms 4 are turned off, when a turning-off operation for the vehicle power source switch 100 is executed after a turning-off operation for the parking switch 120 is executed, the prohibition condition determination unit 172 determines that a prohibition condition for prohibiting the automatic application control is satisfied.

Specifically, when the turning-off operation for the parking switch 120 is continued for a predetermined time period T1 or longer, the prohibition condition determination unit 172 determines that the turning-off operation for the parking switch 120 is executed. In this embodiment, the predetermined time period T1 is T1=1 to 5 [seconds], for example. When the turning-off operation for the vehicle power source switch 100 is executed within a predetermined time period T2 after the turning-off operation for the parking switch 120 is finished, the prohibition condition determination unit 172 determines that the prohibition condition is satisfied. In this embodiment, the predetermined time period T2 is T2=3 to 7 [seconds], for example. Because the turning-off operation for the vehicle power source switch 100 is executed after the turning-off operation for the parking switch 120 is finished, the predetermined time periods T1 and T2 are preferably set as T2>T1. The prohibition condition determination unit 172 further determines that the prohibition condition is satisfied when the slope of a road detected by the slope sensor 130 is at a predetermined angle or smaller. The predetermined angle is ±5% to ±15%, for example.

When the prohibition condition determination unit 172 determines that the prohibition condition is satisfied, the parking brake controller 171 does not execute the automatic application control.

Figure 6:
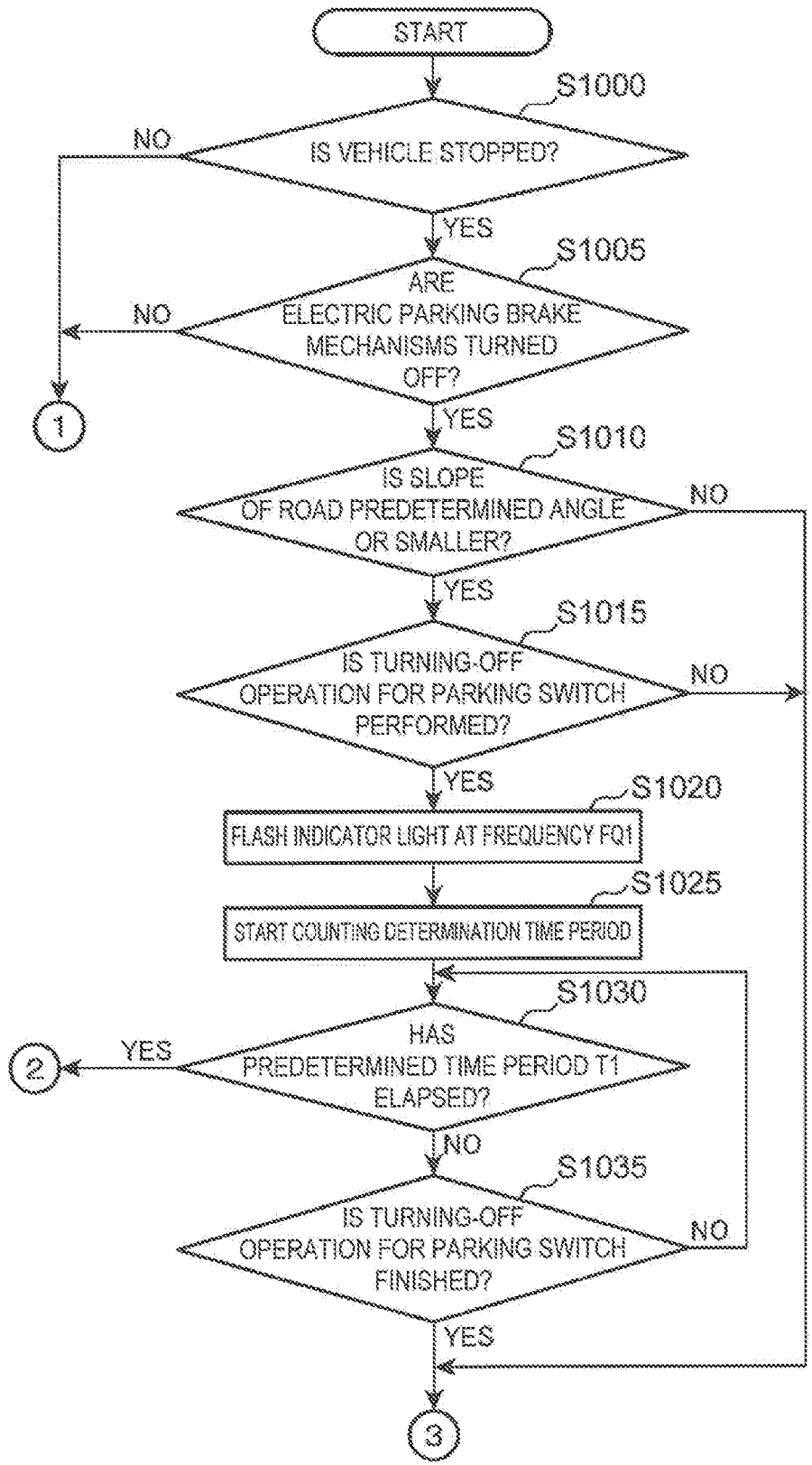
FIG. 6 is a flowchart schematically illustrating one example of an action procedure of the vehicle.
Figure 7:
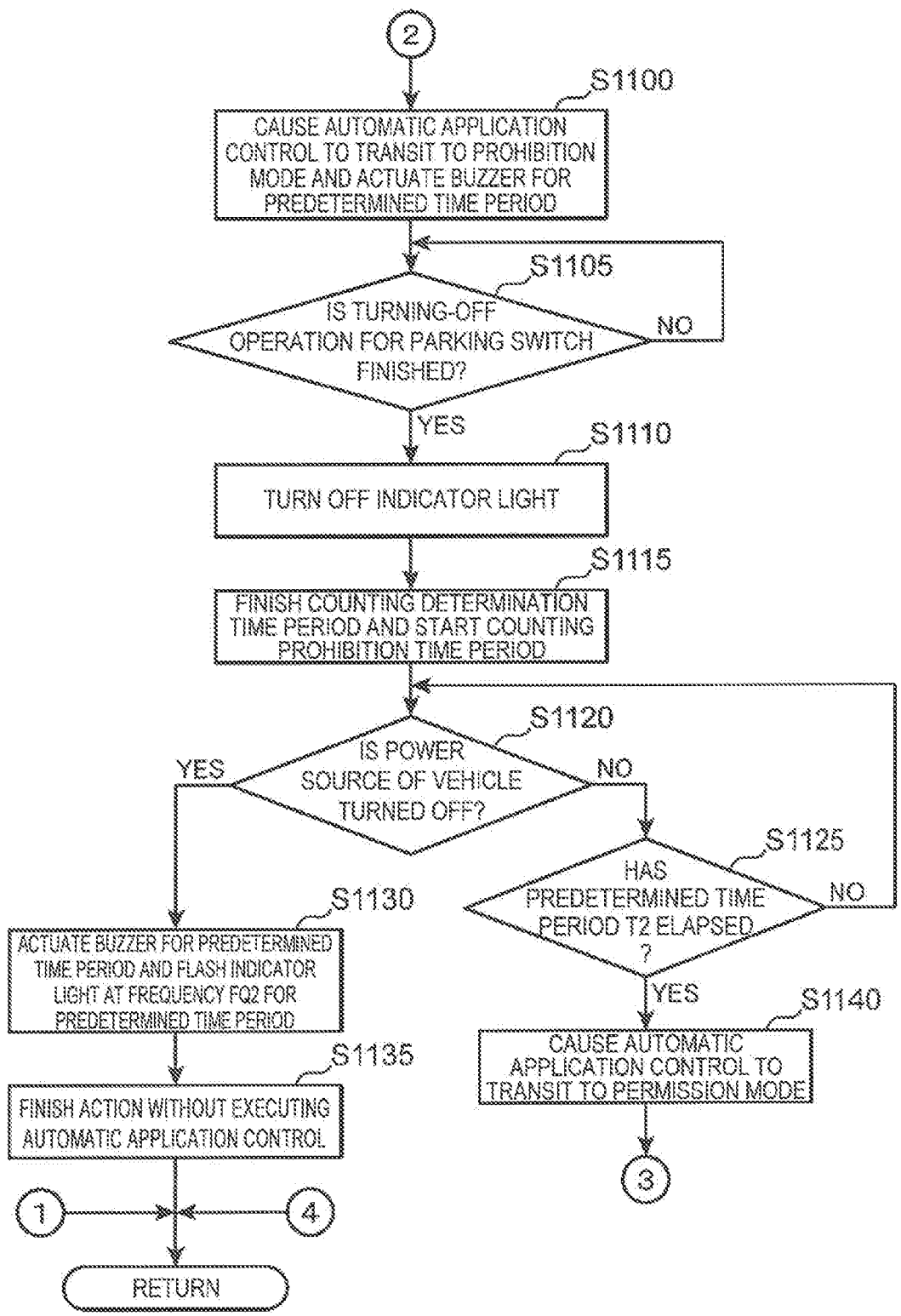
FIG. 7 is a flowchart schematically illustrating one example of the action procedure of the vehicle.
Figure 8:
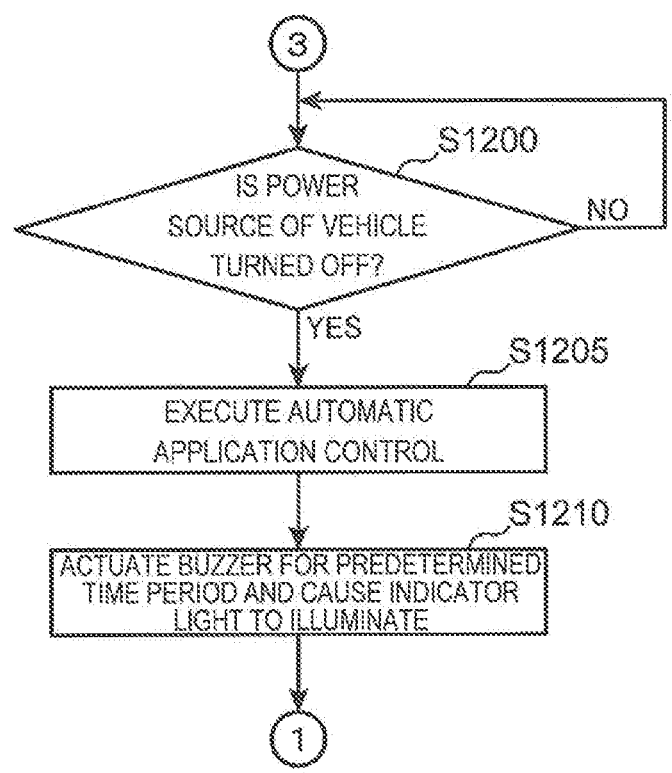
FIG. 8 is a flowchart schematically illustrating one example of the action procedure of the vehicle.
Figure 9:
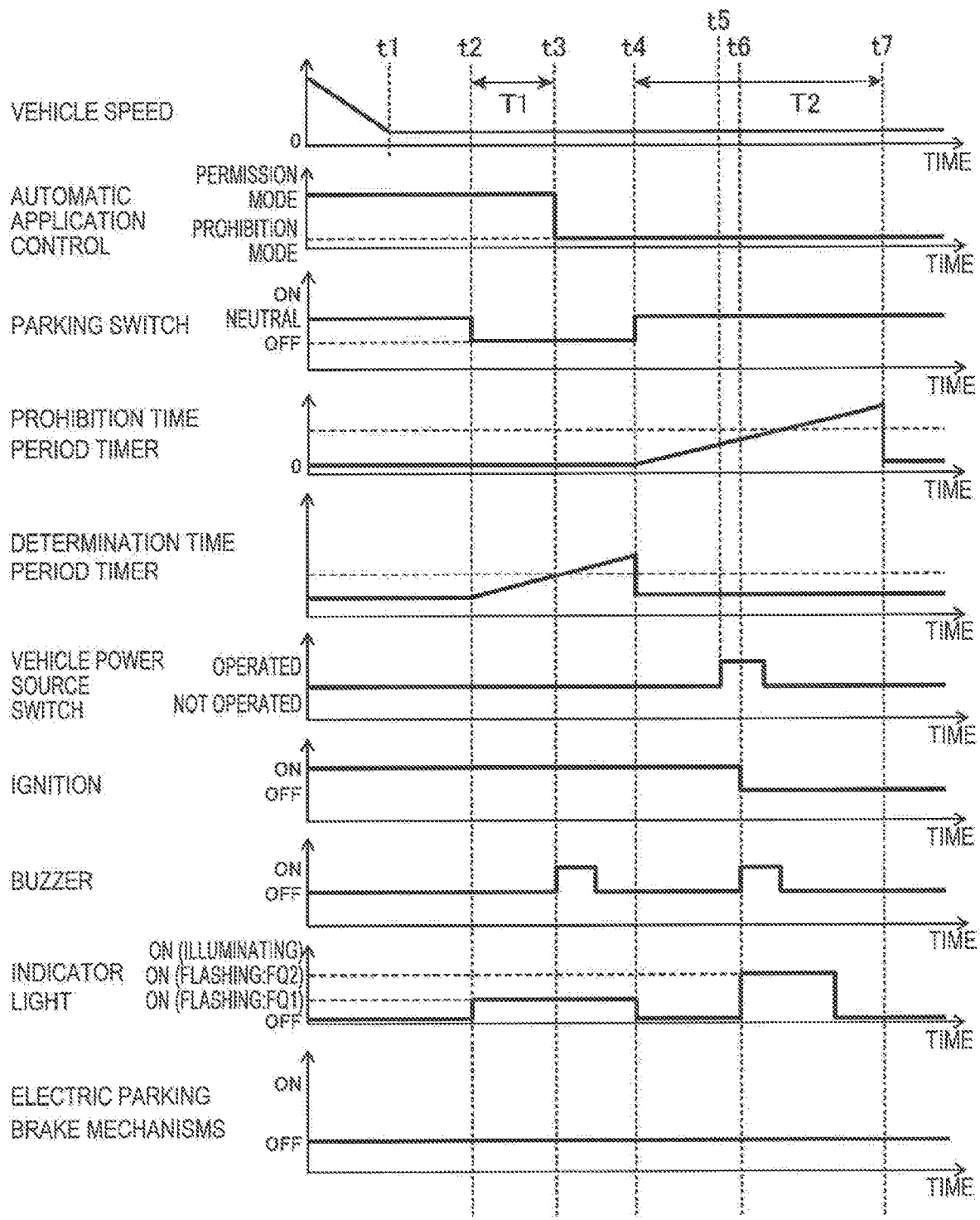
FIG. 9 is a timing chart illustrating a transition of each portion in an action of FIG. 6 to FIG. 8.
Figure 10:
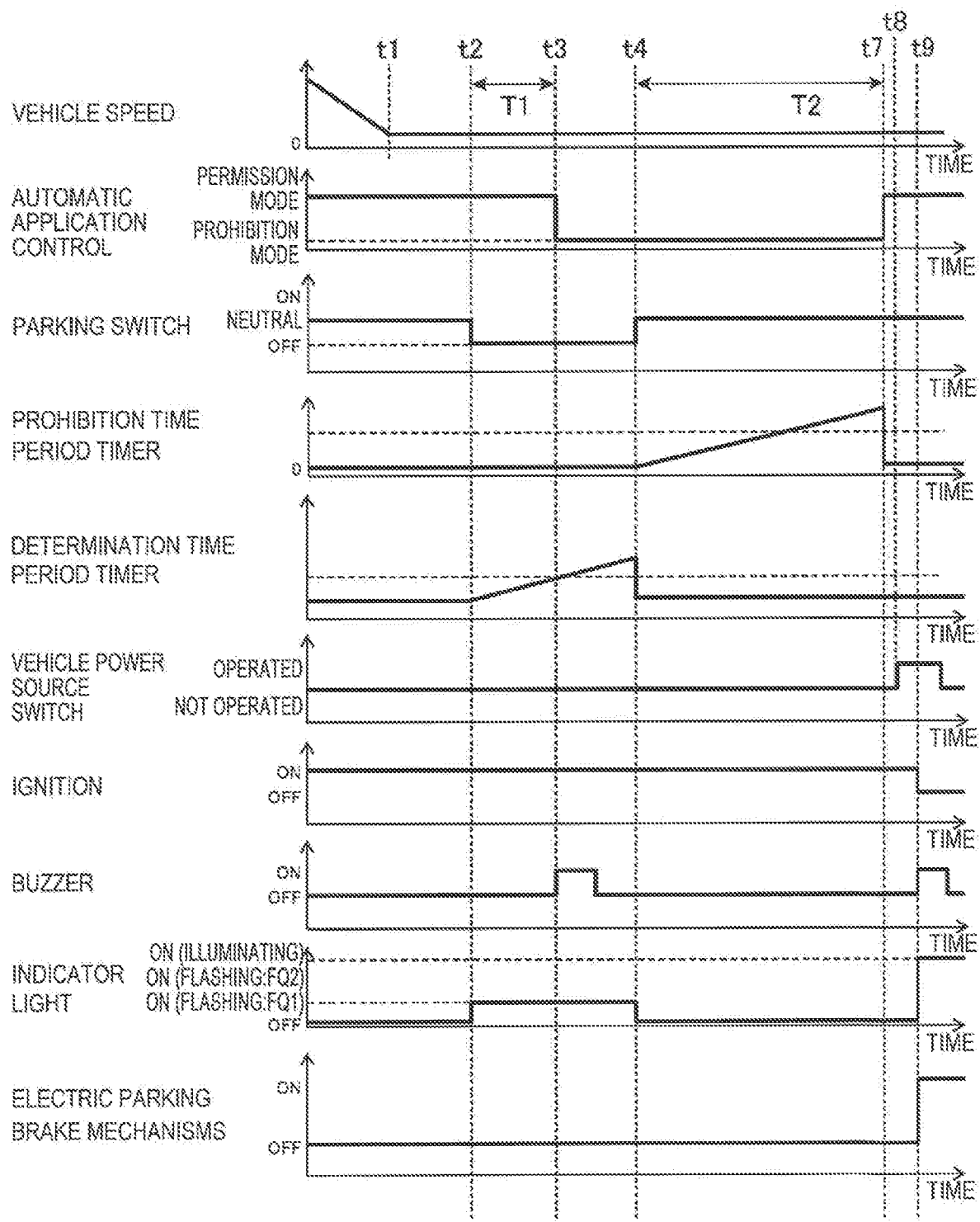
FIG. 10 is a timing chart illustrating a transition of each portion in the action of FIG. 6 to FIG. 8.

FIG. 6 to FIG. 8 are flowcharts schematically illustrating one example of an action procedure of the vehicle 10. FIG. 9 and FIG. 10 are timing charts illustrating transitions of each portion of the vehicle 10 in an action of FIG. 6 to FIG. 8. FIG. 9 illustrates a case where it is determined that the prohibition condition is satisfied and the automatic application control is not executed. FIG. 10 illustrates a case where the automatic application control is executed. The action of FIG. 6 to FIG. 8 is executed every certain time period (for example, 50 msec).

In step S1000 in FIG. 6, the prohibition condition determination unit 172 determines whether or not the vehicle 10 is stopped. For example, based on the detection value from the vehicle speed sensor 110, when a state where the vehicle speed is a predetermined low speed (for example, 2 to 5 km/h) or lower continues for a predetermined time period, the prohibition condition determination unit 172 determines that the vehicle 10 is stopped. When the vehicle 10 is stopped (YES in step S1000), the process moves to step S1005. On the other hand, when the vehicle 10 is not stopped (NO in step S1000), the action of FIG. 6 to FIG. 8 finishes. In FIG. 9 and FIG. 10, it is determined that the vehicle 10 is stopped at time t1.

In step S1005 in FIG. 6, the prohibition condition determination unit 172 determines whether or not the electric parking brake mechanisms 4 are OFF. When the parking brake controller 171 does not actuate the electric motors 43, the prohibition condition determination unit 172 determines that the electric parking brake mechanisms 4 are OFF. When the electric parking brake mechanisms 4 are OFF (YES in step S1005), the process moves to step S1010. On the other hand, when the electric parking brake mechanisms 4 are ON (NO in step S1005), the action of FIG. 6 to FIG. 8 finishes.

In step S1010, the prohibition condition determination unit 172 determines whether or not the slope of a road is at a predetermined angle or smaller based on the detection value from the slope sensor 130. When the slope of the road is at the predetermined angle or smaller (YES in step S1010), the process moves to step S1015. On the other hand, when the slope of the road exceeds the predetermined angle (NO in step S1010), the process moves to step S1200 (FIG. 8).

In step S1015, the prohibition condition determination unit 172 determines whether or not the turning-off operation for the parking switch 120 is performed. When the turning-off operation for the parking switch 120 is performed (YES in step S1015), the process moves to step S1020. On the other hand, when the turning-off operation for the parking switch 120 is not performed (NO in step S1015), the process moves to step S1200 (FIG. 8).

In step S1020, the prohibition condition determination unit 172 informs the indicator controller 174 that the turning-off operation for the parking switch 120 is performed. The indicator controller 174 flashes the indicator light 121 at a frequency FQ1. In this embodiment, the frequency FQ1 is =0.5 to 3 [Hz], for example. In step S1025, the prohibition condition determination unit 172 counts a determination time period. In FIG. 9 and FIG. 10, at time t2, the turning-off operation for the parking switch 120 is performed, flashing of the indicator light 121 is started, and the count of the determination time period is started.

In step S1030, the prohibition condition determination unit 172 determines whether or not the counted determination time period reaches the predetermined time period T1. When the determination time period reaches the predetermined time period T1 (YES in step S1030), the process moves to step S1100 (FIG. 7). On the other hand, when the determination time period does not reach the predetermined time period T1 (NO in step S1030), the process moves to step S1035.

In step S1035, the prohibition condition determination unit 172 determines whether or not the turning-off operation for the parking switch 120 is finished. When the turning-off operation for the parking switch 120 is not finished (NO in step S1035), the process returns to step S1030, and the above steps are repeated. When the turning-off operation for the parking switch 120 is finished (YES in step S1035), the process moves to step S1200 (FIG. 8). That is, in this embodiment, the turning-off operation for the parking switch 120 in a short time period less than the predetermined time period T1 is not dealt with as the tuning-off operation for preventing execution of the automatic application control but dealt with as the turning-off operation performed by mistake.

In step S1100 in FIG. 7, the prohibition condition determination unit 172 informs the parking brake controller 171 and the notification controller 173 that the determination time period reaches the predetermined time period T1. The parking brake controller 171 causes the automatic application control to transit from a permission mode to a prohibition mode. The notification controller 173 actuates the buzzer 150 for a predetermined time period. In FIG. 9 and FIG. 10, at time t3 after the predetermined time period T1 elapses from time t2, the automatic application control is caused to transit from the permission mode to the prohibition mode, and the buzzer 150 is actuated for the predetermined time period. This actuation of the buzzer 150 notifies the occupant that an operation for preventing execution of the automatic application control is accepted.

In step S1105 in FIG. 7, the prohibition condition determination unit 172 determines whether or not the turning-off operation for the parking switch 120 is finished. When the turning-off operation for the parking switch 120 is not finished (NO in step S1105), the prohibition condition determination unit 172 stands by. When the turning-off operation for the parking switch 120 is finished (YES in step S1105), the prohibition condition determination unit 172 informs the indicator controller 174 that the turning-off operation for the parking switch 120 is finished.

In step S1110, the indicator controller 174 turns off the indicator light 121. In step S1115, the prohibition condition determination unit 172 finishes counting the determination time period and starts counting the prohibition time period. In FIG. 9 and FIG. 10, at time t4 when the turning-off operation for the parking switch 120 is finished, the indicator light 121 is turned off, the count of the determination time period is finished, and the count of the prohibition time period is started.

In step S1120 in FIG. 7, the prohibition condition determination unit 172 determines whether or not the power source of the vehicle 10 is turned off by the turning-off operation for the vehicle power source switch 100. When the power source of the vehicle 10 is not turned off (NO in step S1120), the process moves to step S1125. On the other hand, when the power source of the vehicle 10 is turned off (YES in step S1120), the process moves to step S1130.

In step S1125, the prohibition condition determination unit 172 determines whether or not the counted prohibition time period reaches the predetermined time period T2. When the prohibition time period does not reach the predetermined time period T2 (NO in step S1125), the process returns to step S1120, and the above steps are repeated. On the other hand, when the prohibition time period reaches the predetermined time period T2 (YES in step S1125), the process moves to step S1140. In other words, when the turning-off operation for the vehicle power source switch 100 is performed before the prohibition time period reaches the predetermined time period T2, the process moves to step S1130. On the other hand, when the turning-off operation for the vehicle power source switch 100 is not performed before the prohibition time period reaches the predetermined time period T2, the process moves to step S1140.

In step S1130, the prohibition condition determination unit 172 informs the notification controller 173, the indicator controller 174, and the parking brake controller 171 that the power source of the vehicle 10 is turned off. In response to this information, the notification controller 173 actuates the buzzer 150 for a predetermined time period. Further, the indicator controller 174 flashes the indicator light 121 at a frequency FQ2 for a predetermined time period. In this embodiment, FQ2>FQ1 holds, and the frequency FQ2 is =5 to 10 [Hz], for example. Then, the parking brake controller 171 finishes the action of FIG. 6 to FIG. 8 without executing the automatic application control (step S1135).

In FIG. 9, the vehicle power source switch 100 is operated at time t5, and the ignition of the vehicle 10 is turned off at time t6 immediately after that. Then, at time t6, the buzzer 150 is actuated for a predetermined time period, the indicator light 121 flashes for a predetermined time period, and the occupant is thereby notified that the automatic application control is not executed. Then, the process is finished while the electric parking brake mechanisms 4 are not turned on.

In step S1140 in FIG. 7, the prohibition condition determination unit 172 informs the parking brake controller 171 that the prohibition time period reaches the predetermined time period T2 while the power source of the vehicle 10 is not turned off. The parking brake controller 171 causes the automatic application control to transit from the prohibition mode to the permission mode. In FIG. 10, at time t7 after the predetermined time period T2 elapses from time t4, the automatic application control is caused to transit from the prohibition mode to the permission mode.

In next step S1200 in FIG. 8, the parking brake controller 171 determines whether or not the power source of the vehicle 10 is turned off by the turning-off operation for the vehicle power source switch 100. When the power source of the vehicle 10 is not turned off (NO in step S1200), the parking brake controller 171 stands by. On the other hand, when the power source of the vehicle 10 is turned off (YES in step S1200), the process moves to step S1205.

In step S1205, the parking brake controller 171 actuates the electric motors 43 and executes the automatic application control in which the electric parking brake mechanisms 4 are turned on. The parking brake controller 171 informs the notification controller 173 and the indicator controller 174 that the electric parking brake mechanisms 4 are turned on. In response to this information, in step S1210, the notification controller 173 actuates the buzzer 150 for a predetermined time period. Further, the indicator controller 174 causes the indicator light 121 to illuminate. Then, the action of FIG. 6 to FIG. 8 finishes.

In FIG. 10, the vehicle power source switch 100 is operated at time t8, and the ignition of the vehicle 10 is turned off at time t9 immediately after that. Then, the electric parking brake mechanisms 4 are turned on. Further, the indicator light 121 is lit, the buzzer 150 is actuated for the predetermined time period, and the occupant is thereby notified that the electric parking brake mechanisms 4 are turned on.

FIG. 11 is a flowchart schematically illustrating one example of an action procedure about control of the electric parking brake mechanisms 4. The action of FIG. 11 is executed every certain time period (for example, 50 msec).

In step S2000, the parking brake controller 171 determines whether or not the ignition of the vehicle 10 is turned off. When the ignition of the vehicle 10 is turned off (YES in step S2000), the process moves to step S2005. On the other hand, when the ignition of the vehicle 10 is turned on (NO in step S2000), the action of FIG. 11 finishes.

In step S2005, the parking brake controller 171 actuates the electric motors 43 and determines whether or not the electric parking brake mechanisms 4 are turned on. When the electric parking brake mechanisms 4 are turned on (YES in step S2005), the process moves to step S2010. On the other hand, when the electric parking brake mechanisms 4 are turned off (NO in step S2005), the action of FIG. 11 finishes. In step S2010, the parking brake controller 171 prohibits the electric parking brake mechanisms 4 from being turned off and finishes the action of FIG. 11.

As described above, in this embodiment, in a state where the ignition of the vehicle 10 is turned on, a state where the vehicle 10 is stopped, and a state where the electric parking brake mechanisms 4 are OFF, when the turning-off operation for the parking switch 120 is continued for the predetermined time period T1 or longer, the automatic application control is caused to transit from the permission mode to the prohibition mode. Subsequently, when the turning-off operation for the vehicle power source switch 100 is executed and the ignition of the vehicle 10 is turned off before the predetermined time period T2 elapses from a time point when the turning-off operation for the parking switch 120 is finished, it is determined that the prohibition condition for prohibiting the automatic application control is satisfied. When it is determined that the prohibition condition is satisfied, the automatic application control is not executed. Consequently, with the occupant only performing the turning-off operation for the parking switch 120 and the turning-off operation for the vehicle power source switch 100 in this order, non-execution of the automatic application control may thereby easily be achieved.

Further, in this embodiment, when the turning-off operation for the parking switch 120 is finished in less than the predetermined time period T1, the automatic application control is not caused to transit from the permission mode to the prohibition mode. Thus, in a case where the turning-off operation for the parking switch 120 is performed by mistake for a short time period less than the predetermined time period T1, the automatic application control is not prohibited. Consequently, it is possible to handle an incorrect operation of the parking switch 120.

Further, in this embodiment, when the turning-off operation for the vehicle power source switch 100 is not executed before the predetermined time period T2 elapses from the time point when the turning-off operation for the parking switch 120 is finished, it is not determined that the prohibition condition for prohibiting the automatic application control is satisfied. Consequently, in a case where the occupant desires to execute the automatic application control after the turning-off operation for the parking switch 120 is performed, the occupant may choose not to execute the turning-off operation for the vehicle power source switch 100 from a time point when the turning-off operation for the parking switch 120 is finished until the predetermined time period T2 elapses. As described above, in this embodiment, it is possible to handle a schedule change by the occupant.

Further, in this embodiment, as illustrated in FIG. 11, in a state where the ignition of the vehicle 10 is OFF and a state where the electric parking brake mechanisms 4 are ON, even if the parking switch 120 is pushed down and the turning-off operation is performed, the electric parking brake mechanisms 4 are not turned off. Consequently, the electric parking brake mechanisms 4 are not turned off unexpectedly. Thus, in this embodiment, it is possible to improve safety of the vehicle 10.

Modified Embodiments (1) In the above embodiment, as illustrated in FIG. 1, the vehicle 10 may further include a range sensor 140. The range sensor 140 detects the position of a shift lever 52 (FIG. 5) (in other words, a shift range). The range sensor 140 outputs a detection result to the ECU 160. The prohibition condition determination unit 172 may further determine that the prohibition condition is satisfied when the position of the shift lever 52 (FIG. 5) detected by the range sensor 140 is a neutral position. In this case, in FIG. 6, an assessment step about whether or not the position of the shift lever 52 (FIG. 5) is the neutral position may be added between step S1005 and step S1010, between step S1010 and step S1015, or between step S1015 and step S1020, for example.

In this modified embodiment, in a case where the electric parking brake mechanisms 4 have to be turned off such as a case where the vehicle 10 having trouble is towed by another vehicle or a case where the vehicle 10 is washed in a car washing station in Europe, for example, by setting the position of the shift lever 52 (FIG. 5) to the neutral position, non-execution of the automatic application control may thereby be achieved.

(2) In the above embodiment, the vehicle 10 includes the buzzer 150 for notification to the occupant; however, a member for notification to the occupant is not limited to a buzzer. For example, instead of or in addition to a buzzer, a speaker may be included and perform notification to the occupant by sound.

(3) In the above embodiment, as illustrated in FIG. 4 and FIG. 5, the parking switch 120 and the vehicle power source switch 100 are arranged on the left with respect to the steering wheel 56 arranged on the right side with respect to a traveling direction of the vehicle 10. However, in a case where the steering wheel 56 is arranged on the left side with respect to the traveling direction of the vehicle 10, the parking switch 120 and the vehicle power source switch 100 may be arranged on the right with respect to the steering wheel 56. In brief, it is sufficient that the parking switch 120 and the vehicle power source switch 100 are arranged on the same side with respect to the steering wheel 56 (FIG. 4 and FIG. 5) of the vehicle 10. In other words, it is sufficient that the parking switch 120 and the vehicle power source switch 100 are arranged on a central side in the width direction X of the vehicle 10 with respect to the steering wheel 56 of the vehicle 10.

It is possible that when the turning-off operation for the parking switch 120 and the turning-off operation for the vehicle power source switch 100 are simultaneously executed, non-execution of the automatic application control is achieved. However, in a case where the positional relation between the parking switch 120 and the vehicle power source switch 100 is as this modified embodiment or the above embodiment, because the occupant has to twist his/her body in a state where he/she is seated on the driver seat 58, it is difficult to simultaneously execute the turning-off operation for the parking switch 120 and the turning-off operation for the vehicle power source switch 100 by using both hands. Compared to this case, in the above embodiment, the occupant only performs the turning-off operation for the parking switch and the turning-off operation for the vehicle power source switch in this order, and non-execution of the automatic application control may thereby easily be achieved. Consequently, in a case where the positional relation between the parking switch 120 and the vehicle power source switch 100 is as this modified embodiment or the above embodiment, a greater effect may be obtained.

Note that the above-described specific embodiments principally include the invention having the following configurations.

One aspect of the technique disclosed herein provides a parking brake control apparatus controlling a parking brake of the vehicle, the parking brake control apparatus including:

a parking switching operation unit provided in a position at which an occupant of the vehicle can operate the parking switching operation unit, the parking switching operation unit switching the parking brake between ON and OFF;

a vehicle power source switching operation unit provided in a position at which the occupant can operate the vehicle power source switching operation unit, the vehicle power source switching operation unit switching a power source of the vehicle between ON and OFF;

a parking brake controller controlling the parking brake and executing automatic application control in which the parking brake is automatically turned on when the power source of the vehicle is operated from ON to OFF by the occupant with use of the vehicle power source switching operation unit; and a prohibition condition determination unit determining that a prohibition condition for prohibiting the automatic application control is satisfied when a turning-off operation for the vehicle power source switching operation unit is executed after a turning-off operation for the parking switching operation unit is executed in a state where the power source of the vehicle is ON, a state where the vehicle is stopped, and a state where the parking brake is OFF, in which when a determination is made that the prohibition condition is satisfied, the parking brake controller does not execute the automatic application control.

In this aspect, in a state where the power source of the vehicle is ON, a state where the vehicle is stopped, and a state where the parking brake is OFF, when the turning-off operation for the vehicle power source switching operation unit is executed after the turning-off operation for the parking switching operation unit is executed, it is determined that the prohibition condition for prohibiting the automatic application control is satisfied. When it is determined that the prohibition condition is satisfied, the automatic application control is not executed. Consequently, in this aspect, with the occupant only performing the turning-off operation for the parking switching operation unit and the turning-off operation for the vehicle power source switching operation unit in this order, non-execution of the automatic application control may thereby easily be achieved.

In the above aspect, preferably, the parking brake control apparatus further includes a notification unit notifying the occupant that the automatic application control is not executed when a determination is made that the prohibition condition is satisfied.

In this aspect, when it is determined that the prohibition condition is satisfied, the occupant is notified that the automatic application control is not executed. Consequently, in this aspect, the occupant may easily perceive that the automatic application control is not executed.

In the above aspect, preferably, when the turning-off operation for the parking switching operation unit is continued for a predetermined time period or longer, the prohibition condition determination unit determines that the turning-off operation for the parking switching operation unit is executed.

In this aspect, when the turning-off operation for the parking switching operation unit is continued for the predetermined time period or longer, it is determined that the turning-off operation for the parking switching operation unit is executed. Consequently, in this aspect, because it is not determined that the turning-off operation for the parking switching operation unit is executed in a case where the turning-off operation for the parking switching operation unit is performed by mistake for a short time period less than the predetermined time period, the automatic application control may be executed.

In the above aspect, preferably, the parking brake controller does not turn off the parking brake even if the turning-off operation for the parking switching operation unit is executed in a state where the power source of the vehicle is OFF and a state where the parking brake is ON.

In this aspect, even if the turning-off operation for the parking switching operation unit is performed by the occupant by mistake in a state where the power source of the vehicle is OFF and a state where the parking brake is ON, the parking brake is not turned off. Consequently, in this aspect, safety of the vehicle may be enhanced.

In the above aspect, preferably, the parking brake control apparatus further includes a slope sensor detecting a slope of a road on which the vehicle is positioned, and the prohibition condition determination unit further determines that the prohibition condition is satisfied when the slope of the road is at a predetermined angle or smaller.

In this aspect, when the slope of the road on which the vehicle is positioned is at the predetermined angle or smaller, it is determined that the prohibition condition is satisfied. In other words, when the slope of the road on which the vehicle is positioned exceeds the predetermined angle, it is not determined that the prohibition condition is satisfied. Consequently, in this aspect, in a case where the slope of the road on which the vehicle is positioned exceeds the predetermined angle, the automatic application control is executed. Thus, even in a case where the occupant forgets to turn on the parking switching operation unit, the vehicle may preliminarily be prevented from moving due to the slope of the road due to turning-off of the parking brake.

In the above aspect, preferably, the parking brake control apparatus further includes a range sensor detecting a position of a shift lever of the vehicle, and the prohibition condition determination unit further determines that the prohibition condition is satisfied when the shift lever is in a neutral position.

In this aspect, it is determined that the prohibition condition is satisfied when the shift lever is in the neutral position. Thus, in a case where the shift lever is moved to the neutral position when the vehicle is towed, for example, non-execution of the automatic application control may be achieved.

In the above aspect, preferably, the parking switching operation unit and the vehicle power source switching operation unit are arranged on a same side in a width direction of the vehicle with respect to a steering wheel of the vehicle.

It is possible that when the turning-off operation for the parking switching operation unit and the turning-off operation for the vehicle power source switching operation unit are simultaneously executed, non-execution of the automatic application control is achieved. However, in this aspect, the parking switching operation unit and the vehicle power source switching operation unit are arranged on the same side in the width direction of the vehicle with respect to the steering wheel of the vehicle. Thus, because the occupant has to twist his/her body in a state where he/she is seated on the driver seat, it is difficult to simultaneously execute the turning-off operation for the parking switching operation unit and the turning-off operation for the vehicle power source switching operation unit by using both hands. Compared to this case, in this aspect, the occupant only performs the turning-off operation for the parking switching operation unit and the turning-off operation for the vehicle power source switching operation unit in this order, and non-execution of the automatic application control may thereby easily be achieved. Consequently, in a case where the positional relation between the parking switching operation unit and the vehicle power source switching operation unit is in this manner, a greater effect may be obtained.

In the above aspect, preferably, the parking switching operation unit and the vehicle power source switching operation unit are arranged on a central side in a width direction of the vehicle with respect to a steering wheel of the vehicle.

It is possible that when the turning-off operation for the parking switching operation unit and the turning-off operation for the vehicle power source switching operation unit are simultaneously executed, non-execution of the automatic application control is achieved. However, in this aspect, the parking switching operation unit and the vehicle power source switching operation unit are arranged on the central side in the width direction of the vehicle with respect to the steering wheel of the vehicle. Thus, because the occupant has to twist his/her body in a state where he/she is seated on the driver seat, it is difficult to simultaneously execute the turning-off operation for the parking switching operation unit and the turning-off operation for the vehicle power source switching operation unit by using both hands. Compared to this case, in this aspect, the occupant only performs the turning-off operation for the parking switching operation unit and the turning-off operation for the vehicle power source switching operation unit in this order, and non-execution of the automatic application control may thereby easily be achieved. Consequently, in a case where the positional relation between the parking switching operation unit and the vehicle power source switching operation unit is in this manner, a greater effect may be obtained.

Another aspect of the technique disclosed herein provides a parking brake control apparatus for a vehicle, the parking brake control apparatus controlling a parking brake braking a wheel, the parking brake control apparatus comprising:

a parking switching operation unit provided in a position at which an occupant of the vehicle can operate the parking switching operation unit, the parking switching operation unit switching a braking state and a non-braking state of the parking brake;

a vehicle power source switching operation unit provided in a position at which the occupant can operate the vehicle power source switching operation unit, the vehicle power source switching operation unit switching an ON state and an OFF state of a vehicle power source; and a parking brake controller that, in the ON state of the vehicle power source, a state where the vehicle is stopped, and the non-braking state of the parking brake, switches the parking brake from the non-braking state to the braking state when the vehicle power source is operated to the OFF state by the occupant with use of the vehicle power source switching operation unit and maintains the parking brake in the non-braking state when the vehicle power source is operated to the OFF state by the occupant with use of the vehicle power source switching operation unit after the parking brake is operated to the non-braking state by the occupant with use of the parking switching operation unit.

In this aspect, in the ON state of the vehicle power source, a state where the vehicle is stopped, and the non-braking state of the parking brake, when the vehicle power source is operated to the OFF state by the occupant with use of the vehicle power source switching operation unit, the parking brake is switched from the non-braking state to the braking state. Consequently, in this aspect, even if the occupant forgets to operate the parking switching operation unit, the parking brake may automatically be set to the braking state.

In this aspect, in the ON state of the vehicle power source, a state where the vehicle is stopped, and the non-braking state of the parking brake, when the vehicle power source is operated to the OFF state by the occupant with use of the vehicle power source switching operation unit after the parking brake is operated to the non-braking state by the occupant with use of the parking switching operation unit, the parking brake is maintained in the non-braking state. Consequently, in this aspect, the occupant only performs an operation for switching the parking brake to the non-braking state by using the parking switching operation unit and an operation for switching the vehicle power source to the OFF state by using the vehicle power source switching operation unit in this order, and the parking brake may thereby easily be maintained in the non-braking state.

The invention claimed is:

1. A parking brake control apparatus for a vehicle, the parking brake control apparatus controlling a parking brake of the vehicle, the parking brake control apparatus comprising:

a parking switching operation unit provided in a position at which an occupant of the vehicle can operate the parking switching operation unit, the parking switching operation unit switching the parking brake between ON and OFF;

a vehicle power source switching operation unit provided in a position at which the occupant can operate the vehicle power source switching operation unit, the vehicle power source switching operation unit switching a power source of the vehicle between ON and OFF;

a parking brake controller controlling the parking brake and executing automatic application control in which the parking brake is automatically turned on when the power source of the vehicle is operated from ON to OFF by the occupant with use of the vehicle power source switching operation unit; and a prohibition condition determination unit determining that, in a state where the parking brake is OFF, the vehicle is stopped, and the vehicle power source is ON, a prohibition condition for prohibiting the automatic application to automatically turn the parking brake on is satisfied when a turning-off operation for the vehicle power source switching operation unit is executed after a turning-off operation for the parking switching operation unit is executed, wherein when a determination is made that the prohibition condition is satisfied, the parking brake controller does not execute the automatic application control.

2. The parking brake control apparatus for a vehicle according to claim 1, further comprising
a notification unit notifying the occupant that the automatic application control is not executed when a determination is made that the prohibition condition is satisfied.

3. The parking brake control apparatus for a vehicle according to claim 2, wherein
when the turning-off operation for the parking switching operation unit is continued for a predetermined time period or longer, the prohibition condition determination unit determines that the turning-off operation for the parking switching operation unit is executed.

4. The parking brake control apparatus for a vehicle according to claim 3, wherein
the parking brake controller does not turn off the parking brake even if the turning-off operation for the parking switching operation unit is executed in a state where the power source of the vehicle is OFF and a state where the parking brake is ON.

5. The parking brake control apparatus for a vehicle according to claim 3, further comprising
a slope sensor detecting a slope of a road on which the vehicle is positioned, wherein
the prohibition condition determination unit further determines that the prohibition condition is satisfied when the slope of the road is at a predetermined angle or smaller.

6. The parking brake control apparatus for a vehicle according to claim 3, further comprising
a range sensor detecting a position of a shift lever of the vehicle, wherein
the prohibition condition determination unit further determines that the prohibition condition is satisfied when the shift lever is in a neutral position.

7. The parking brake control apparatus for a vehicle according to claim 2, wherein
the parking brake controller does not turn off the parking brake even if the turning-off operation for the parking switching operation unit is executed in a state where the power source of the vehicle is OFF and a state where the parking brake is ON.

8. The parking brake control apparatus for a vehicle according to claim 2, further comprising
a slope sensor detecting a slope of a road on which the vehicle is positioned, wherein
the prohibition condition determination unit further determines that the prohibition condition is satisfied when the slope of the road is at a predetermined angle or smaller.

9. The parking brake control apparatus for a vehicle according to claim 2, further comprising
a range sensor detecting a position of a shift lever of the vehicle, wherein
the prohibition condition determination unit further determines that the prohibition condition is satisfied when the shift lever is in a neutral position.

10. The parking brake control apparatus for a vehicle according to claim 1, wherein
when the turning-off operation for the parking switching operation unit is continued for a predetermined time period or longer, the prohibition condition determination unit determines that the turning-off operation for the parking switching operation unit is executed.

11. The parking brake control apparatus for a vehicle according to claim 10, wherein
the parking brake controller does not turn off the parking brake even if the turning-off operation for the parking switching operation unit is executed in a state where the power source of the vehicle is OFF and a state where the parking brake is ON.

12. The parking brake control apparatus for a vehicle according to claim 10, further comprising
a slope sensor detecting a slope of a road on which the vehicle is positioned, wherein
the prohibition condition determination unit further determines that the prohibition condition is satisfied when the slope of the road is at a predetermined angle or smaller.

13. The parking brake control apparatus for a vehicle according to claim 10, further comprising
a range sensor detecting a position of a shift lever of the vehicle, wherein
the prohibition condition determination unit further determines that the prohibition condition is satisfied when the shift lever is in a neutral position.

14. The parking brake control apparatus for a vehicle according to claim 1, wherein
the parking brake controller does not turn off the parking brake even if the turning-off operation for the parking switching operation unit is executed in a state where the power source of the vehicle is OFF and a state where the parking brake is ON.

15. The parking brake control apparatus for a vehicle according to claim 1, further comprising
a slope sensor detecting a slope of a road on which the vehicle is positioned, wherein
the prohibition condition determination unit further determines that the prohibition condition is satisfied when the slope of the road is at a predetermined angle or smaller.

16. The parking brake control apparatus for a vehicle according to claim 1, further comprising
a range sensor detecting a position of a shift lever of the vehicle, wherein
the prohibition condition determination unit further determines that the prohibition condition is satisfied when the shift lever is in a neutral position.

17. The parking brake control apparatus for a vehicle according to claim 1, wherein
the parking switching operation unit and the vehicle power source switching operation unit are arranged on a same side in a width direction of the vehicle with respect to a steering wheel of the vehicle.

18. The parking brake control apparatus for a vehicle according to claim 1, wherein
the parking switching operation unit and the vehicle power source switching operation unit are arranged on a central side in a width direction of the vehicle with respect to a steering wheel of the vehicle.

19. A parking brake control apparatus for a vehicle, the parking brake control apparatus controlling a parking brake braking a wheel, the parking brake control apparatus comprising:
a parking switching operation unit provided in a position at which an occupant of the vehicle can operate the parking switching operation unit, the parking switching operation unit switching a braking state and a non-braking state of the parking brake;
a vehicle power source switching operation unit provided in a position at which the occupant can operate the vehicle power source switching operation unit, the vehicle power source switching operation unit switching an ON state and an OFF state of a vehicle power source; and a parking brake controller that, in the ON state of the vehicle power source, when the vehicle is stopped and the parking brake is in the non-braking state, switches the parking brake from the non-braking state to the braking state when the vehicle power source is operated to the OFF state by the occupant with use of the vehicle power source switching operation unit and maintains the parking brake in the non-braking state when the vehicle power source is operated to the OFF state by the occupant with use of the vehicle power source switching operation unit after the parking brake is operated to the non-braking state by the occupant with use of the parking switching operation unit.

* * * * *